United States Patent [19]

Propster

[11] 4,252,485
[45] Feb. 24, 1981

[54] GLASS BATCH AGGLOMERATE FLOW DIVERTER FOR FORMING BEDS OF UNIFORM HEIGHT

[75] Inventor: Mark A. Propster, Gahanna, Ohio

[73] Assignee: Owens-Corning Fiberglas Corporation, Toledo, Ohio

[21] Appl. No.: 31,288

[22] Filed: Apr. 19, 1979

[51] Int. Cl.³ .............................................. B65G 65/32
[52] U.S. Cl. ..................................... 414/160; 65/335; 193/2 R; 414/293
[58] Field of Search ................ 414/160, 165, 204–206, 414/293, 299, 786; 65/335; 193/2 R, 3; 222/564; 266/184; 406/157, 163

[56] References Cited

U.S. PATENT DOCUMENTS

| 653,110 | 7/1900 | Morrison | 266/184 |
|---|---|---|---|
| 785,311 | 3/1905 | Ladd et al. | 414/205 |
| 1,319,005 | 10/1919 | Kawai | 414/205 |
| 1,523,745 | 1/1925 | Bartelmus | 414/205 |
| 3,010,620 | 11/1961 | Folse | 222/564 |
| 3,415,504 | 12/1968 | Smith et al. | 414/206 X |
| 3,945,511 | 3/1976 | Delorme | 414/293 |

FOREIGN PATENT DOCUMENTS

468842  7/1937  United Kingdom ..................... 414/205

*Primary Examiner*—Johnny D. Cherry
*Attorney, Agent, or Firm*—Ronald C. Hudgens; Robert F. Rywalski

[57] ABSTRACT

Method and apparatus are provided for distributing a downwardly flowing stream of water-containing glass batch agglomerates in such fashion that the stream is diverted so as to form a bed of substantially uniform height on an agglomerate-supporting bottom wall of an enclosed chamber. There is contemplated the use of plural members for this purpose, including a first member, preferably in the shape of a tubular-like, right frusto-conical member and disposed internally thereof a second member, preferably in the form of a right, frusto-pyramidal member.

8 Claims, 2 Drawing Figures

GLASS BATCH AGGLOMERATE FLOW DIVERTER FOR FORMING BEDS OF UNIFORM HEIGHT

CROSS REFERENCES TO RELATED APPLICATIONS

The present invention is related to concurrently filed applications U.S. Ser. No. 31,369, now abandoned, and to U.S. Ser. No. 31,368, now abandoned, both of which are hereby incorporated by reference.

TECHNICAL FIELD

Generally, the present invention is directed to the use of glass batch agglomerates in a process and apparatus for manufacturing glass. More specifically, the present invention is directed to the formation of a bed of glass batch agglomerates having a substantially uniform height so as to allow such agglomerates to be preconditioned for their use in an overall process of preheating glass batch agglomerates to an elevated temperature prior to vitrification in a glass melter.

BACKGROUND AND SUMMARY OF THE INVENTION

In the above incorporated patent applications, processes and apparatus are described in which free water-containing agglomerates, preferably pellets, are first preconditioned as a bed in a preconditioning chamber and then discharged into a hopper, or preheating chamber, having a vertical bed wherein the pellets are then heated to an elevated temperature prior to vitrification. The vitrification may be effected in a fossil fuel fired glass melter or an electric melter. Combustion products, for example flue gases from a fossil fuel fired melter, are conveyed substantially in countercurrent flow to the agglomerates to the vertical bed, wherein they release some of their heat by direct contact with the agglomerates therein, and then are withdrawn from the preheating chamber containing such vertical bed and introduced to preconditioning beds where at least some of the water from the free water-containing glass batch agglomerates is removed. In order to most easily control and reliably practice the preconditioning step, it is important that the preconditioning beds have as uniform an upper surface as possible, i.e., that the bed be of a substantially uniform height. That is, there is a need when a stream of gravitationally, downwardly flowing agglomerates are introduced into a preconditioning chamber to provide a technique for diverting that stream so that upon continued gravitational flow the agglomerates will form a bed of substantially uniform height.

In accordance with one feature of this invention there is provided an apparatus for distributing glass batch agglomerates, and especially pellets, into a chamber having an agglomerate supporting bottom portion so as to form a bed in the chamber of substantially uniform height. Generally, the apparatus comprises a vertically disposed duct extending into the chamber and supplying the stream of agglomerates thereto, the longitudinal axis of the duct is substantially coaxial with the vertical axis of the chamber. There is also provided a first hollow member disposed beneath the duct, the member having an open top portion disposed within the flow path of the supplied agglomerates and including a downwardly and outwardly extending perimetrical wall portion also disposed in the flow path. Disposed inwardly of the first member is a second member also having a downwardly and outwardly extending perimetrical wall portion disposed in the flow path of the agglomerates. The apparatus is so arranged and constructed that a portion of the stream of agglomerates supplied through the vertical duct is diverted outwardly upon contact with the perimetrical wall of the first member and another portion, in the nature of a core, of the stream passes through the open top of the first member; at least a portion of that other portion, i.e., the core, is then diverted outwardly upon contact with the perimetrical wall of the second member. Additionally, means are provided for adjusting the position of the members in the chamber relative to the supplied flow of agglomerates.

BRIEF DESCRIPTION OF THE DRAWINGS

Referring now to the drawings.

DESCRIPTION

Figure 1:
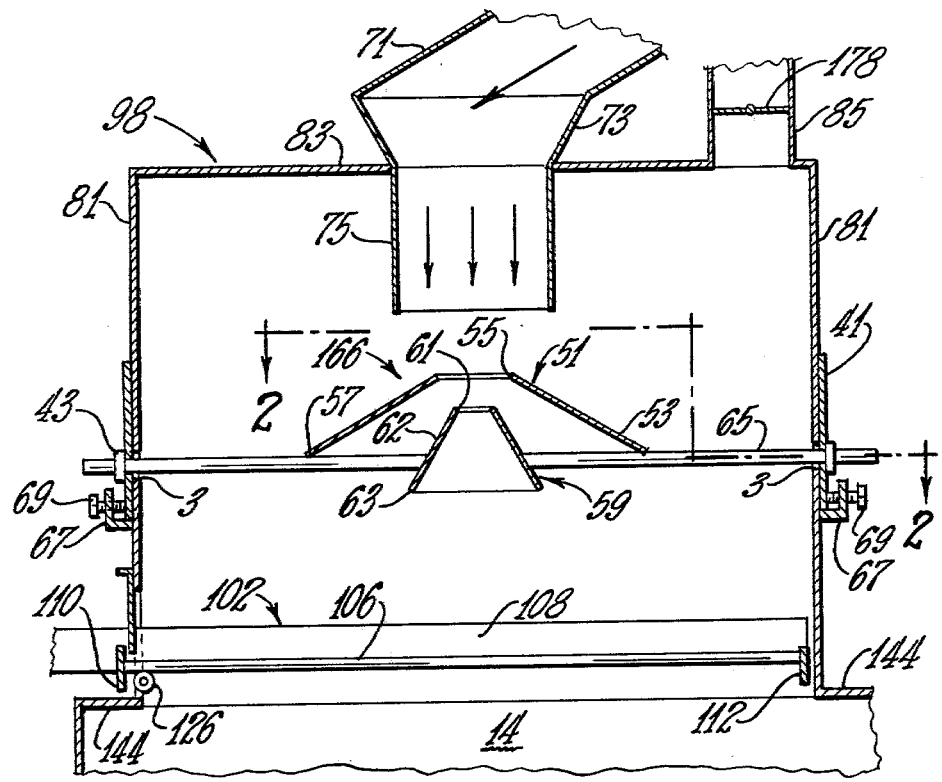
FIG. 1 is generally a vertical sectional view through a preconditioning unit exemplifying the present invention.

Generally, as set forth in the above incorporated applications, there is employed a preconditioning unit, preferably plural units, having a preconditioning chamber 98. Preconditioning chamber 98 essentially includes a top wall 83 and substantially vertically disposed side walls 81. The preconditioning unit is mounted on the top wall 144 of a hopper or preheating chamber 14 in which is maintained a gravitationally downwardly flowing vertical bed of agglomerates. The agglomerate supporting bottom portion of chamber 98 is generally in the form of a reciprocating, drawer-like box or receptacle 102 which has a porous bottom, i.e., a bottom which allows combustion products coming from preheating chamber 14 to pass therethrough and thereby pass in direct contact to a bed formed within pellet preconditioning chamber 98. Preferably, the bottom of receptacle 102 will comprise a plurality of parallel rods 106, the rods being spaced on appropriate center lines to retain agglomerates thereon, but yet to substantially allow passage of gases therethrough with a minimal pressure drop. Drawer-like receptacle 102 includes an inner end wall 112 and an outer end wall 110 and side walls 108. Generally, receptacle 102 will reciprocate inwardly and outwardly, in an appropriate sequence, generally on rollers as exemplified by rollers 126. For further details with regard to receptacle 102, its operation and the general operation of the preconditioning chambers reference may be had to the above-incorporated applications.

Preferably, the preconditioning unit will be substantially square in cross section, and preferably cubic in volume, and will include in its top wall 83 a gas exhaust port 85 having a valve 178 therein. Essentially, valve 178 will be closed, thereby precluding substantial flow of gases through chamber 98 while pellets are being charged into the preconditioning unit onto drawer like receptacle 102 and will be open during the preconditioning heating period. After preconditioning receptacle 102 is withdrawn outwardly so as to discharge the bed into the vertical bed of preheating chamber 14. Extending through top wall 83 of the preconditioning chamber 98 is a substantially vertically disposed duct 75, which is generally substantially coaxial with the vertically extending axis of the chamber. Duct 75 serves to supply a stream of free water containing glass batch agglomerates, preferably pellets, into the chamber, with the agglomerates initially being supplied through a duct 71 through, for example, a reducer duct 73 into duct 75. Preferably duct 75 will extend into chamber 98 a distance equal to about 1 to 2 times, most desirably about 1.5 times, the diameter of duct 75.

Disposed adjacently downwardly of the lower margin of duct 75, for example within a couple of inches, are adjustable flow distributing members generally designated 166. These flow distributors preferably comprise a first member 51 having an open top portion 55 and a downwardly and outwardly extending perimetrical wall portion 53 terminating in an open bottom portion 57. Disposed inwardly of first member 51 is a second member 59 having a top portion 61 and a downwardly and outwardly extending perimetrical wall 62 which terminates in an open bottom 63. The top portion 61 of second member 59 may either be open or closed. In the preferred embodiment, member 51 will generally be in the form of a tubular-like, right frusto-conical member and second member 59 will be a right frusto-pyramidal configuration. Outstandingly uniform bed heights will be obtained, for example when supplying pellets to preconditioning chamber 98, when the ratio of the maximum diameter of perimetrical wall 53 of first member 51 (i.e. the diameter of opening 57) to the length of the side of a square preconditioning chamber is about 1:2. Additionally, such outstanding results are attained when the angle, with respect to the horizontal, of perimetrical wall 53 of first member 51 is in the range of about 30° to about 38° with the angle, with respect to the horizontal, of perimetrical wall 62 of second member 59 being in the range of about 55° to about 65°. In usual operation, preferred frusto-pyramidal member 59 and preferred frusto-conical member 51 will be substantially coaxially aligned and, in turn, be substantially coaxial with the vertical axis of vertically disposed duct 75. As generally shown, it will be preferred that the diameters of top portion 55 and top portion 61 be smaller than that of duct 75 such that each may be positioned within the general flow stream of the agglomerates discharged from duct 75.

Figure 2:
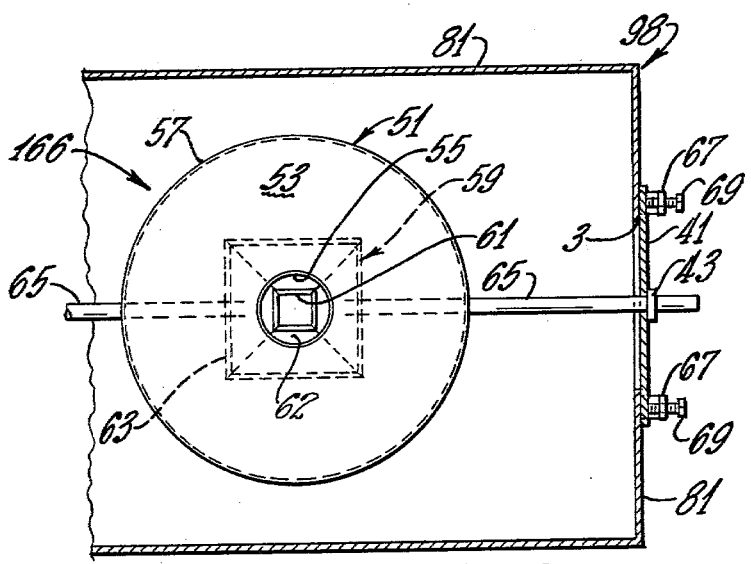
FIG. 2 is generally a view taken along the line 2—2 of FIG. 1.

Means are also provided for adjusting the position of the first and second members, 51 and 59, in the chamber. Such means includes, for example, a threaded flow distributor adjusting rod 65 traversing chamber 98 and generally passing through a slot-like opening 3 on oppositely disposed vertical side walls 81. Adjusting rod 65 is operatively connected to members 51 and 59 so as to allow movement thereof with movement of the adjusting rod. Such operative attachment may be in the form of a threaded connection or even a welded connection. Mounted on opposite side walls 81 are a pair of generally L-shaped support brackets 67, each of which includes a setscrew 69. Substantially traversing openings 3 on opposite vertical side walls 81 is a moveable plate 41 through which distributor adjusting rod 65 likewise passes. In order to adjust the flow distributors 166 in a first direction (parallel to the plane of FIG. 1) a suitable adjusting means in the form of nut 43 is employed to laterally adjust and hold rod 65. In order to adjust flow distributing device 166 in a second direction (parallel to the plane of the drawing of FIG. 2), plate 41 is laterally moved to the desired position and then locked in place by use of setscrews 69.

In passing, it should be mentioned that generally it will be preferred to use some sort of gasketing material on plates 41 since the preconditioning chamber will be under a negative pressure. In this way uncontrolled leakage of air into the preconditioning chamber will be minimized.

Thus, as the general proposition it will be appreciated that first of all, a stream of pellets will be discharged gravitationally downwardly through vertically disposed duct 75. A generally perimetrical portion of the discharged stream will be diverted outwardly by contact with the downwardly and outwardly disposed wall 53 of first member 51. The general central portion of the initial stream will then proceed downwardly through open top portion 55 and, in turn, at least a portion thereof will be diverted outwardly by contact with downwardly and outwardly extending wall 62. No significant benefits have been observed as to whether top 61 of second member 59 be open or as a solid wall. However, it will be appreciated that if top 61 is open, generally a core portion of the core portion passing through top portion 55 of first member 51 will pass through such open top 61. Generally, the vertically disposed walls of the chambers confine the extent of outward movement of the diverted portions of the streams, and quite surprisingly it has been found that a substantially uniform height of agglomerates can be provided in this manner.

While some adjustments will be necessary with various types of agglomerates, quite outstanding results have been obtained when forming beds of pellets having a size generally in the range of about ¼ inch to about 1 inch, and more typically about ⅜ inch to about ⅝ inch when certain ratios were employed. In such instances, the ratio of the cross-sectional area of chamber 98 to the area of the base or bottom portion 57 of a frusto-conical member 51 was about 5:1, the ratio of the area of the base or bottom portion of the frusto-conical member to the area of the top portion 55 being on the order of about 19:1, the ratio of the area of the base portion 63 of a frusto-conical member 59 to the area of top portion 62 being about 20:1. Desirably, the ratio of the area of the base portion 57 to the area of the base portion 63 will be about 5–6:1.

Having described my invention it will, of course, be apparent that modifications are possible which pursuant to the patent statutes and laws do not depart from the spirit and scope thereof.

I claim:

1. Apparatus for distributing agglomerates into a chamber having an agglomerate supporting bottom so as to form a bed in said chamber of substantially uniform height comprising, a vertically disposed duct supplying said agglomerates to said chamber, the longitudinal axis of said duct being substantially coaxial with the vertically extending axis of said chamber, a first, hollow member disposed beneath said duct, said member having an open top portion disposed within the flow path of said supplied agglomerates and including a downwardly and outwardly extending perimetrical wall portion also disposed in said flow path, a second member disposed inwardly of said first member having a downwardly and outwardly extending perimetrical wall portion disposed in the flow path of agglomerates passing through said open top of said first member, said apparatus being so arranged and constructed that a portion of the agglomerates supplied are continuously diverted outwardly upon contact with the perimetrical wall of said first member and another portion continuously passes the open top thereof, at least a portion of said another portion then being continuously diverted outwardly upon contact with the perimetrical wall of said second member so as to form said bed beneath said first and second members, and further including means for adjusting said first and second members as a unit laterally sidewise in said chamber, said means comprising a horizontal rod directly connected to said first and second members and adjustable means for moving said rod laterally sidewise.

2. The apparatus of claim 1 wherein said adjustable means includes a horizontally disposed slot-like opening in said chamber and a movable plate substantially traversing said opening, said rod passing through said slot and said opening, a nut means to laterally move the rod in a first lateral direction and set screws for adjusting said plate, said rod and first and second members thereby being adjustable in a second lateral direction.

3. The apparatus of claim 2 wherein said chamber has a square cross-section.

4. The apparatus of claim 3 wherein said first member has a circular cross-section.

5. The apparatus of claim 4 wherein said second member has a square cross-section.

6. The apparatus of claim 5 wherein said second member has an open top portion, said apparatus being so arranged and constructed so that a portion of said another portion passes downwardly through the open top of said second member.

7. The apparatus of claim 2 wherein said first member is a tubular-like, right frusto-conical member, and said second member is a right frusto-pyramidal member.

8. The apparatus of claim 7 wherein the ratio of the cross-sectional area of said chamber to the area of the base portion of said frusto-conical member is about 5:1, the ratio of the area of the base portion of said frusto-conical member to the area of its top portion is about 19:1, the ratio of area of the base portion of said frusto-pyramidal member to the area of its top portion is about 20:1, and the ratio of the area of the base portion of said frusto-conical member to the area of the base portion of said frusto-pyramidal member is about 5–6:1.

* * * * *